(12) United States Patent
Furuya (10) Patent No.: US 7,718,270 B2
(45) Date of Patent: May 18, 2010

(54) MULTIFUNCTIONAL MATERIAL (75) Inventor: Masahiro Furuya, Tokyo (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 130 days.

(21) Appl. No.: 11/884,567

(22) PCT Filed: Feb. 16, 2006

(86) PCT No.: PCT/JP2006/302709

§ 371 (c)(1),
(2), (4) Date: Aug. 17, 2007

(87) PCT Pub. No.: WO2006/090631

PCT Pub. Date: Aug. 31, 2006

(65) Prior Publication Data

US 2008/0152869 A1    Jun. 26, 2008

(30) Foreign Application Priority Data

Feb. 24, 2005  (JP) .............................. 2005-049785

(51) Int. Cl.
*B32B 9/00*  (2006.01)
(52) U.S. Cl. ....................... 428/469; 428/472; 428/701; 428/702
(58) Field of Classification Search ................. 428/472, 428/697, 701; 502/100, 108
See application file for complete search history.

(56) References Cited

U.S. PATENT DOCUMENTS

| | | | |
|---|---|---|---|
| 6,455,465 B1 * | 9/2002 | Miyasaka | .................... 502/350 |
| 6,794,065 B1 | 9/2004 | Morikawa et al. | |
| 6,835,688 B2 | 12/2004 | Morikawa et al. | |
| 2004/0126624 A1 * | 7/2004 | Akbar et al. | ................. 428/701 |

FOREIGN PATENT DOCUMENTS

| | | |
|---|---|---|
| JP | 9-241038 | 9/1997 |
| JP | 9-262481 | 10/1997 |
| JP | 10-53437 | 2/1998 |
| JP | 11-12720 | 1/1999 |
| JP | 2001-205094 | 7/2001 |
| JP | 2001-205103 | 7/2001 |
| JP | 2001-205105 | 7/2001 |
| JP | 2002-95976 | 4/2002 |

(Continued)

OTHER PUBLICATIONS

Christoper Leyens and Manfred Peters, Titanium and Titanium Alloys, No Month 2003, Wiley-VCH, p. 13 and pp. 203-204.*

(Continued)

*Primary Examiner*—Timothy M Speer
(74) *Attorney, Agent, or Firm*—Young & Thompson (57) ABSTRACT

The multifunctional material can readily adsorb even VOCs, which exhibits high photocatalytic activity and functions as visible-light-responsive photocatalyst by virtue of a large surface area and of being doped with carbon, has high hardness and exhibits excellent exfoliation resistance, wear resistance, resistance to chemicals, and heat resistance. The multifunctional material has a large number of protrusions of titanium oxide or a titanium alloy oxide on at least a portion of a surface of the material for example forest microcolumns of titanium oxide, the layer being exposed on the surface and the microcolumns being doped with carbon.

18 Claims, 6 Drawing Sheets

FOREIGN PATENT DOCUMENTS

| | | |
|---|---|---|
| JP | 2002-253975 | 9/2002 |
| JP | 2002-370027 | 12/2002 |
| JP | 2002-370034 | 12/2002 |
| JP | 2003-226825 A | 8/2003 |
| JP | 2003-260370 A | 9/2003 |
| JP | 2004-344687 A | 12/2004 |
| WO | 01/10553 A1 | 2/2001 |

OTHER PUBLICATIONS

Gong, D. et al., Titanium oxide nanotube arrays prepared by anodic oxidation, Dec. 2001, Journal of Materials Research, vol. 12, p. 3331-3334.*

Furuya, "Taikyusei to Shokubai Kassei o Kojo Saseta Kashiko Otogata Hikari Shokubai 'Fresh Green' no Kaishatu," Photocatalysis, No. 12, pp. 58-59 (2003).

Fujishima et al., "Hydrogen Production under Sunlight with an Electrochemical Photocell," Potential Differences, vol. 122, No. 11, pp. 1487-1489, Journal of Electrochemical Society Nov. 1975.

Asahi et al., "Visible-Light Photocatalysis in Nitrogen-Doped Titanium Oxides," Science, vol. 293, pp. 269-271 (Jul. 13, 2001).

Shahed et al., "Efficient Photochemical Water Splitting by a Chemically Modified n-$Tio_2$", Science. vol. 297, pp. 2243-2245 (Sep. 27, 2002).

Furuya, "Development of Visible Light Photocatalyst with Superior Durability and High Catalytic Activity 'Fresh Green'," Japan Soc. of Mech. Eng., vol. 6, pp. 311-312 (2004).

* cited by examiner

MULTIFUNCTIONAL MATERIAL

TECHNICAL FIELD

The present invention relates to a multifunctional material and, more particularly, to a multifunctional material which can readily adsorb even volatile organic compounds (VOCs) by virtue of numerous protrusions of titanium oxide or a titanium alloy oxide which are provided on at least a portion of a surface thereof; which exhibits high photocatalytic activity and functions as visible-light-responsive photocatalyst by virtue of a large surface area and being doped with carbon; and which has high hardness and exhibits excellent exfoliation resistance, wear resistance, resistance to chemicals, and heat resistance.

BACKGROUND ART

Hitherto, titanium dioxide ($TiO_2$) (referred to simply as "titanium oxide" in the present specification and appended claims) has been known to be a substance exhibiting a photocatalytic function. Since the 1970's, attempts have been made to form a titanium oxide film on the surface of metallic titanium. Known titanium oxide film formation methods include a method in which a titanium oxide film is formed on the surface of metallic titanium through anodization; a method in which a titanium oxide film is thermally formed on the surface of a metallic titanium sheet in an electric furnace supplied with oxygen; and a method in which a metallic titanium sheet is heated in the combustion flames of city gas at 1,100 to 1,400° C., to thereby form a titanium oxide film on the surface of the metallic titanium sheet (see Non-Patent Document 1).

In order to produce a photocatalytic product exhibiting deodorant, antibacterial, antifog, or antifouling effect by virtue of its photocatalytic function, generally, a substrate is coated with titanium oxide sol through spray coating, spin coating, dipping, or a similar technique, thereby forming a film (see, for example, Patent Documents 1 to 3). However, the formed coating film is likely to undergo exfoliation or wear, and therefore the thus-produced product is difficult to use over a long period of time. Meanwhile, there has been known a method for forming a photocatalytic coating through sputtering (see, for example, Patent Documents 4 and 5).

As has also been known, when crystal nuclei produced through any process (e.g., CVD or PVD) are placed in a sol containing an inorganic or organic metal compound, to thereby grow titanium oxide crystals from the crystal nuclei, or when a sol is applied to the crystal nuclei, followed by solidification and thermal treatment, to thereby grow titanium oxide crystals from the crystal nuclei, the thus-grown titanium oxide crystals assume a columnar shape, and exhibit high photocatalytic activity (see, for example, Patent Documents 6 to 8). However, in such a case, columnar crystals are grown only from seed crystals provided on a substrate, and thus the thus-grown columnar crystals exhibit insufficient bonding strength to the substrate. Therefore, the thus-produced photocatalyst is not necessarily satisfactory in terms of durability (e.g., wear resistance).

Meanwhile, in order to exhibit a photocatalytic function, titanium oxide must receive an UV ray having a wavelength of 400 nm or less. Thus, many studies have been carried out on doping titanium oxide with various elements so as to realize a titanium oxide photocatalyst which functions by visible light. For example, there has been reported that a nitrogen-doped titanium oxide sample serves as an excellent visible-light-responsive catalyst among titanium oxide samples each doped with F, N, C, S, P, Ni, or a like element (see Non-Patent Document 2).

There have also been proposed photocatalysts formed from titanium oxide doped with other elements; for example, a titanium compound in which oxygen sites are substituted with other atoms such as nitrogen, a titanium compound doped with other elements such as nitrogen in an interstitial space of the compound, and a titanium compound in which atoms such as nitrogen are introduced into the grain boundaries of a mass of titanium oxide polycrystals (see, for example, Patent Documents 9 to 12). However, these photocatalysts exhibit unsatisfactory durability, such as poor wear resistance.

Patent Document 1: Japanese Patent Application Laid-Open (kokai) No. 09-241038
Patent Document 2: Japanese Patent Application Laid-Open (kokai) No. 09-262481
Patent Document 3: Japanese Patent Application Laid-Open (kokai) No. 10-053437
Patent Document 4: Japanese Patent Application Laid-Open (kokai) No. 11-012720
Patent Document 5: Japanese Patent Application Laid-Open (kokai) No. 2001-205105
Patent Document 6: Japanese Patent Application Laid-Open (kokai) No. 2002-253975
Patent Document 7: Japanese Patent Application Laid-Open (kokai) No. 2002-370027
Patent Document 8: Japanese Patent Application Laid-Open (kokai) No. 2002-370034
Patent Document 9: Japanese Patent Application Laid-Open (kokai) No. 2001-205103
Patent Document 10: Japanese Patent Application Laid-Open (kokai) No. 2001-205094
Patent Document 11: Japanese Patent Application Laid-Open (kokai) No. 2002-95976
Patent Document 12: Pamphlet of WO01/10553
Non-Patent Document 1: A. Fujishima, et al., J. Electrochem. Soc. Vol. 122, No. 11, pp. 1487-1489, November 1975
Non-Patent Document 2: R. Asahi et al., Science Vol. 293, Jul. 13 (2001), pp. 269-271

DISCLOSURE OF THE INVENTION

Problems to be Solved by the Invention

An object of the present invention is to provide to a multifunctional material which can readily adsorb even VOCs, which exhibits high photocatalytic activity and functions as visible-light-responsive photocatalyst by virtue of a large surface area and being doped with carbon, and which has high hardness and exhibits excellent exfoliation resistance, wear resistance, resistance to chemicals, and heat resistance.

Means for Solving the Problems

In order to achieve the aforementioned object, the present inventor has conducted extensive studies. As a result, the present inventor has found that when a substrate in which at least a surface layer thereof is formed of titanium, titanium oxide, a titanium alloy, or a titanium alloy oxide is thermally treated under specific conditions by applying a combustion flame of an unsaturated hydrocarbon, particularly acetylene, directly to a surface of the substrate, or when the surface of the substrate is thermally treated under specific conditions in an exhaust gas atmosphere generated by combustion of an unsaturated hydrocarbon, particularly acetylene, a layer formed of forest microcolumns of titanium oxide or a titanium alloy oxide is provided in the interior of the surface layer; and that when the layer formed of the forest microcolumns is cut in parallel with the surface layer, there are produced a material including the substrate and a layer formed of the titanium-oxide- or titanium-alloy-oxide-formed forest microcolumns exposed on at least a portion of the substrate, as well as a material including a thin film, numerous continuous small-width protrusions which are provided thereon, and forest microcolumns formed on the protrusions, wherein the protrusions and microcolumns are formed of titanium oxide or a titanium alloy oxide and are exposed on the thin film. That is, the present inventor has found that both materials have a large number of protrusions of titanium oxide or a titanium alloy oxide on at least a portion of a surface of the materials; both of the materials are useful multifunctional materials; and the microcolumns (protrusions) of titanium oxide or a titanium alloy oxide and continuous small-width protrusions are doped with carbon, whereby a multifunctional material which exhibits high photocatalytic activity and functions as visible-light-responsive photocatalyst, which can readily adsorb even volatile organic compounds (VOCs), and which has high hardness and exhibits excellent exfoliation resistance, wear resistance, resistance to chemicals, and heat resistance can be produced. The present invention has been accomplished on the basis of these findings.

In other words, a characteristic feature of the multifunctional material of the present invention resides in that the material has a large number of protrusions of titanium oxide or a titanium alloy oxide on at least a portion of a surface of the material (e.g., forest microcolumns of titanium oxide or a titanium alloy oxide are exposed on at least a portion of a surface of the material), or the material has a thin film, numerous continuous small-width protrusions which are provided thereon and forest microcolumns formed on the protrusions, wherein the protrusions and microcolumns are formed of titanium oxide or a titanium alloy oxide and are exposed on the thin film, wherein the protrusions (e.g., microcolumns) and the small-width protrusions are doped with carbon.

EFFECTS OF THE INVENTION

The multifunctional material of the present invention exhibits high photocatalytic activity and functions as visible-light-responsive photocatalyst, which can readily adsorb even volatile organic compounds (VOCs), and which has high hardness and exhibits excellent exfoliation resistance, wear resistance, resistance to chemicals, and heat resistance.

BRIEF DESCRIPTION OF THE DRAWINGS

[FIG. 1]
[FIG. 2]
[FIG. 3]
[FIG. 4]
[FIG. 5]
[FIG. 6]
[FIG. 7]
[FIG. 8]
[FIG. 9]

BEST MODES FOR CARRYING OUT THE INVENTION

The multifunctional material of the present invention may be produced by thermally treating a substrate in which at least a surface layer thereof is formed of titanium, titanium oxide, a titanium alloy, or a titanium alloy oxide by applying a combustion flame of, for example, an unsaturated hydrocarbon (particularly acetylene) to a surface of the substrate, to thereby provide, in the interior of the surface layer, a layer formed of forest microcolumns of titanium oxide or a titanium alloy oxide; and subsequently cutting the layer formed of the forest microcolumns in parallel with the surface layer through application of, for example, thermal stress, shear stress, or tensile force, to thereby yield a material including the substrate and a layer formed of the titanium-oxide- or titanium-alloy-oxide-formed forest microcolumns exposed on at least a portion (generally a predominant portion) of the substrate, as well as a material including a thin film, numerous continuous small-width protrusions which are provided thereon, and forest microcolumns formed on the protrusions, wherein the protrusions and microcolumns are formed of titanium oxide or a titanium alloy oxide and exposed on the thin film. That is, the two types of functional materials, each having a large number of protrusions of titanium oxide or a titanium alloy oxide which are formed on at least a portion of the surface thereof, also fall within the scope of the present invention.

The substrate in which at least a surface layer thereof is formed of titanium, titanium oxide, a titanium alloy, or a titanium alloy oxide, may be entirely formed of titanium, titanium oxide, a titanium alloy, or a titanium alloy oxide. Alternatively, the substrate may include a top-surface-forming layer formed of titanium, titanium oxide, a titanium alloy, or a titanium alloy oxide, and a base formed of a material other than such a titanium material. No particular limitation is imposed on the form of the substrate for providing a final product exhibiting photocatalytic activity and/or super hydrophilicity, and the substrate may have any form (e.g., a flat plate form or three-dimensional form).

In the case where the substrate, in which at least a surface layer thereof is formed of titanium, titanium oxide, a titanium alloy, or a titanium alloy oxide, includes a top-surface-forming layer formed of titanium, titanium oxide, a titanium alloy, or a titanium alloy oxide, and a base formed of a material other than such a titanium material, the thickness (amount) of the top-surface-forming layer may be equal to that of a layer formed of forest microcolumns of titanium oxide or a titanium alloy oxide (i.e., the entirety of the top-surface-forming layer serves as the layer formed of the titanium-oxide- or titanium-alloy-oxide-formed forest microcolumns), or may be greater than that of the layer formed of the titanium-oxide- or titanium-alloy-oxide-formed forest microcolumns (i.e., a portion of the top-surface-forming layer (in a thickness direction) serves as the layer formed of the forest microcolumns, and the remaining portion does not undergo any change). No particular limitation is imposed on the material of the base, so long as the material does not burn, melt, or deform during thermal treatment in the production of the multifunctional material of the present invention. The base may be formed of, for example, iron, an iron alloy, a nonferrous alloy, glass, or ceramic material. Such a substrate including a thin-film-form surface layer and a base may be prepared through, for example, a process in which a coating of titanium, titanium oxide, a titanium alloy, or a titanium alloy oxide is formed on the surface of a base through sputtering, vapor deposition, spraying, or a similar technique, or a process in which a commercially available titanium oxide sol is applied onto the surface of a base through spray coating, spin coating, or dipping, to thereby form a coating on the base surface. The thickness of the thus-formed surface layer is preferably 0.5 µm or more, more preferably 4 µm or more.

No particular limitation is imposed on the aforementioned titanium alloy employed, and a variety of known titanium alloys may be employed. Examples of titanium alloys which may be employed include Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, and Ti-13V-11Cr-3Al.

In the production of the multifunctional material of the present invention, a combustion flame of, for example, a gas predominantly containing an unsaturated hydrocarbon (particularly acetylene) is employed. Particularly, a reducing flame is preferably employed. In a preferred mode of the production of the multifunctional material of the present invention, a gas mixture containing at least 50 vol. % of unsaturated hydrocarbon (e.g., at least 50 vol. % of acetylene) and an appropriate amount of air, hydrogen, oxygen, etc. is employed. In the production of the multifunctional material of the present invention, a fuel component of 100% acetylene is most preferred. When an unsaturated hydrocarbon (particularly acetylene having a triple bond) is employed, the unsaturated moiety is decomposed during combustion, particularly in a reducing flame, to thereby form intermediate radical species. Since the radical species have strong reactivity, the multifunctional material is readily doped with carbon, and the incorporated carbon forms a Ti—C bond. In the case where microcolumns are doped with carbon, hardness of the microcolumns increases, whereby mechanical strength of the functional material including hardness and wear resistance and heat resistance of the material can be enhanced.

In the production of the multifunctional material of the present invention, the substrate, which has a surface layer formed of titanium, titanium oxide, a titanium alloy, or a titanium alloy oxide, is thermally treated at high temperature by applying a combustion exhaust gas directly to a surface of the substrate; or the surface of the substrate is thermally treated at high temperature in an oxygen-containing gas atmosphere. The thermal treatment may be performed by means of, for example, a gas burner, or may be performed in a furnace. When the surface is heated at high temperature through direct application of a combustion flame thereto, the flame is directly applied to the substrate by means of a gas burner. In the case where the substrate is heated at high temperature in a combustion exhaust gas atmosphere, a fuel gas as described above is combusted in a furnace, and an atmosphere containing the high-temperature combustion exhaust gas may be employed.

The temperature and time for the thermal treatment must be regulated so that a layer formed of forest microcolumns of titanium oxide or a titanium alloy oxide is provided in the interior of the surface layer formed of titanium, titanium oxide, a titanium alloy, or a titanium alloy oxide; and subsequently the layer formed of the forest microcolumns is cut in parallel with the surface layer through application of, for example, thermal stress, shear stress, or tensile force, to thereby yield a material including the substrate and a layer formed of the titanium-oxide- or titanium-alloy-oxide-formed forest microcolumns exposed on at least a portion of the substrate, as well as a material including a thin film, numerous continuous small-width protrusions which are provided thereon, and forest microcolumns formed on the protrusions, wherein the protrusions and microcolumns are formed of titanium oxide or a titanium alloy oxide and exposed on the thin film. The heating is preferably carried out at 600° C. or higher.

The thermal treatment under the aforementioned conditions forms an intermediate piece including a layer formed of forest microcolumns (layer height: about 1 to about 20 µm, average diameter of the microcolumns: about 0.2 to about 3 µm), and a thin film provided on the layer and having a thickness of about 0.1 to about 10 µm. Thereafter, the layer formed of the forest microcolumns is cut in parallel with the surface layer through application of, for example, thermal stress, shear stress, or tensile force, to thereby yield a material including the substrate and a layer formed of the titanium-oxide- or titanium-alloy-oxide-formed forest microcolumns exposed on at least a portion of the substrate (i.e., the entirety of the thin film, which is provided on the layer formed of the forest microcolumns on the substrate, may be exfoliated from the layer, or a portion of the thin film may fail to be exfoliated and remain on the layer), as well as a material including the thin film, numerous continuous small-width protrusions which are provided thereon, and forest microcolumns formed on the protrusions, wherein the protrusions and microcolumns are formed of titanium oxide or a titanium alloy oxide and exposed on the thin film.

When the layer formed of the forest microcolumns is cut in parallel with the surface layer through application of thermal stress, for example, either of a surface and a back surface of the substrate is cooled or heated, to thereby provide a difference in temperature between these surfaces. In this case, cooling is performed by, for example, bringing the surface or the back surface of the aforementioned hot intermediate piece into contact with a cooling object (e.g., a stainless steel block), or blowing cooling air (air of ambient temperature) to the surface or the back surface of the aforementioned hot intermediate piece. When the hot intermediate piece is left to cool, thermal stress is generated, but the stress is small.

When the layer formed of the forest microcolumns is cut in parallel with the surface layer through application of shear stress, for example, friction force is applied to the surface and the back surface of the aforementioned intermediate piece in relatively opposite directions. When the layer formed of the forest microcolumns is cut in parallel with the surface layer through application of tensile force, for example, tensile force is applied to the surface and the back surface of the aforementioned intermediate piece in opposite directions perpendicular to the surfaces by means of, for example, vacuum suction pads. In the case where only a material in which the layer formed of the titanium-oxide- or titanium-alloy-oxide-formed forest microcolumns is exposed on at least a portion of the substrate is separated from the entirety, there may be removed, through grinding, sputtering, or a similar technique, a portion of the aforementioned intermediate piece, the portion corresponding to a material including the thin film, numerous continuous small-width protrusions which are provided thereon and formed of titanium oxide or a titanium alloy oxide, and forest microcolumns exposed on the protrusions.

In the thus-obtained material in which the layer formed of the titanium-oxide- or titanium-alloy-oxide-formed forest microcolumns is exposed on at least a portion of the substrate, height of the layer formed of the forest microcolumns varies depending on the level of the microcolumns at which the layer formed of the forest microcolumns is cut in parallel with the surface layer. However, generally, the height of the layer formed of the forest microcolumns is about 1 to about 20 µm, and the average diameter of the microcolumns is about 0.5 to about 3 µm. This material is a multifunctional material which can readily adsorb VOCs, which has a large surface area and thus exhibits high photocatalytic activity, which has high coating hardness, and which exhibits excellent exfoliation resistance, wear resistance, resistance to chemicals, and heat resistance.

Meanwhile, the above-obtained material including a thin film, numerous continuous small-width protrusions which are provided thereon and formed of titanium oxide or a titanium alloy oxide, and forest microcolumns exposed on the protrusions is in the form of small fragments, and protrusions of each of the fragments have a height of about 2 to about 12 µm. Height of the microcolumns varies depending on the level of the microcolumns at which the layer formed of the forest microcolumns is cut in parallel with the surface layer, but generally, the height of the microcolumns is about 1 to about 5 µm, and the average diameter of the microcolumns is about 0.2 to about 0.5 µm. However, under some conditions for cutting the layer formed of the forest microcolumns in parallel with the surface layer, virtually no microcolumns may be present on numerous continuous small-width protrusions, and the protrusions may be exposed. Also, this material can adsorb VOCs, has a large surface area, and thus exhibits high photocatalytic activity. This material may be employed as it is, or may be pulverized before use. The thus-pulverized product can also readily adsorb VOCs, has a large surface area, and thus exhibits high photocatalytic activity.

In the multifunctional material of the present invention, a layer formed of forest microcolumns of titanium oxide or a titanium alloy oxide, numerous continuous small-width protrusions, and microcolumns provided on the protrusions are doped with carbon. Therefore, the material responds to visible light having a wavelength of 400 nm or more (not to mention UV rays), and is particularly effective as a photocatalyst. That is, the material can be employed as a visible-light-responsive photocatalyst, and exhibits photocatalytic function even indoors (not to mention outdoors).

Figure 1:
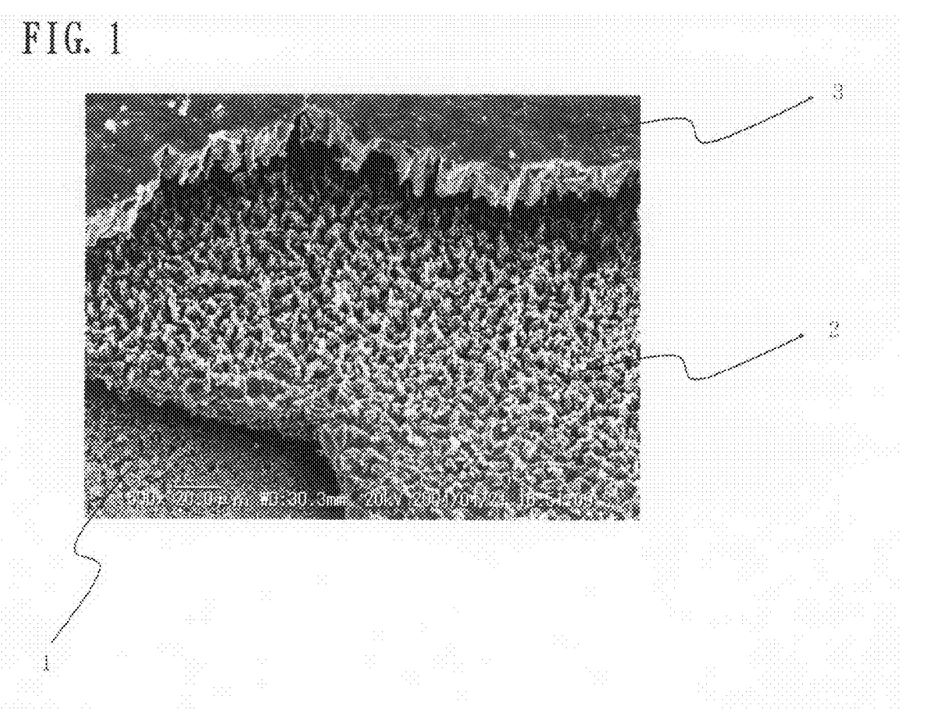
FIG. 1 is a micrograph of a multifunctional material obtained in Example 1.
Figure 4:
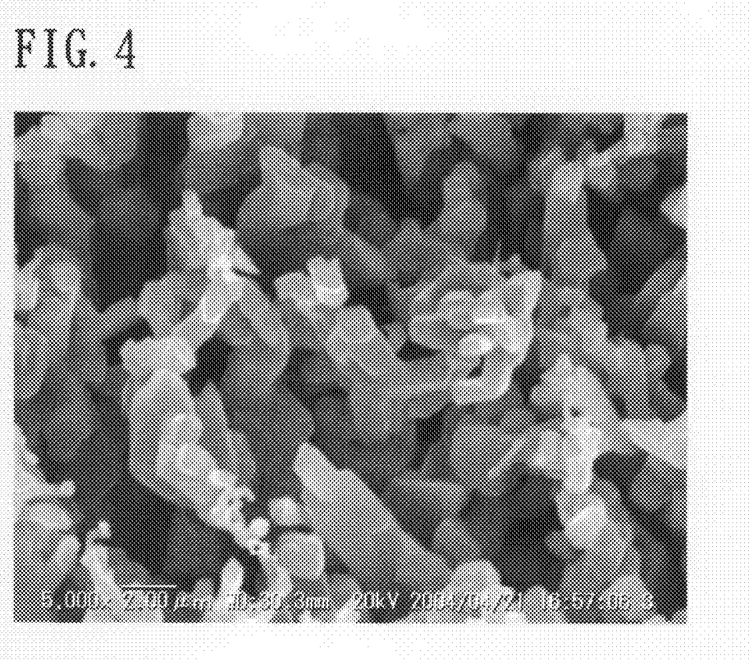
FIG. 4 is a micrograph showing the state of a layer 2 formed of white forest microcolumns of titanium oxide.

In a layer formed of forest microcolumns of titanium oxide or a titanium alloy oxide on a substrate, which layer is formed through the production method of the present invention, as shown by micrographs of FIGS. 1 and 4, each of the microcolumns has, for example, a prismatic form, a cylindrical form, a pyramidal form, a conical form, an inverted pyramidal form, or an inverted conical form. For example, each of the microcolumns extends straight in a direction perpendicular or oblique to the surface of the substrate, extends in a curved or bending form, extends in a branched form, or extends in a form of combination thereof. The entire form of the microcolumns can be represented by various expressions, including a frost crystal form, a raised carpet form, a coral form, a colonnaded form, and a form of columns built with building blocks. The width, height, bottom size, etc. of the microcolumns vary depending on, for example, thermal treatment conditions.

Figure 3:
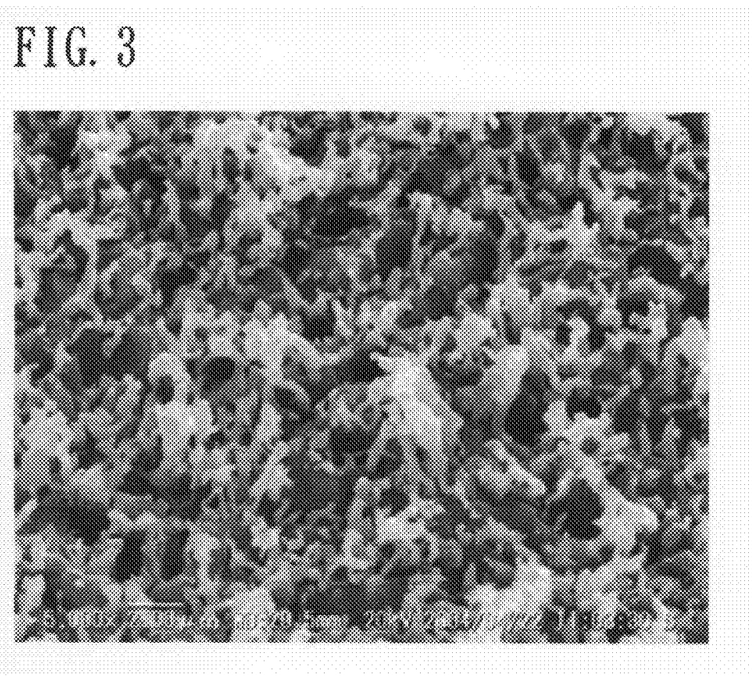
FIG. 3 is a micrograph showing the state of the surface of the fragmented material 3, as viewed from the side where the thin film has thereon the numerous continuous white small-width protrusions formed of titanium oxide on which the microcolumns are exposed.

In the material of the present invention including a thin film, numerous continuous small-width protrusions which are provided thereon and are formed of titanium oxide or a titanium alloy oxide, and forest microcolumns exposed on the protrusions, as shown in a micrograph of FIG. 3, the numerous continuous small-width protrusions have an appearance of the exterior of walnut shell or an appearance of pumice stone, and each of the continuous small-width protrusions has an appearance of a bent wrinkle-like or crinkle-like pattern. The form of the microcolumns exposed on the protrusions is similar to that of the microcolumns constituting the layer provided on the substrate. However, since most of the microcolumns are cut at binding portions between the microcolumns and the thin film, generally, the density of the microcolumns exposed on the protrusions is smaller than that of the microcolumns constituting the layer provided on the substrate.

EXAMPLES

The present invention will next be described in more detail with reference to Examples and Comparative Examples.

Examples 1 to 4

A surface of a titanium sheet (thickness: 0.3 mm) was thermally treated with a combustion flame of acetylene at a surface layer temperature shown in Table 1 for a period of time shown in Table 1. Thereafter, when the surface subjected to the combustion flame was brought into contact with a flat surface of a stainless steel block (thickness: 30 mm) for cooling the sheet, the resultant product was separated into a material including the titanium sheet, and a layer formed of white forest microcolumns of titanium oxide, the layer exposed on the major portion of the titanium sheet surface; and fragmented materials, each including a thin film, numerous continuous white small-width protrusions provided thereon, and forest microcolumns formed on the protrusions, wherein the protrusions and microcolumns are formed of titanium oxide and exposed on the thin film. Specifically, the layer formed of the titanium oxide forest microcolumns, which had been formed in the interior of the surface layer of the titanium sheet through thermal treatment, was cut in parallel with the surface layer through cooling after the thermal treatment. Thus, multifunctional materials of Examples 1 to 4 were obtained.

Figure 2:
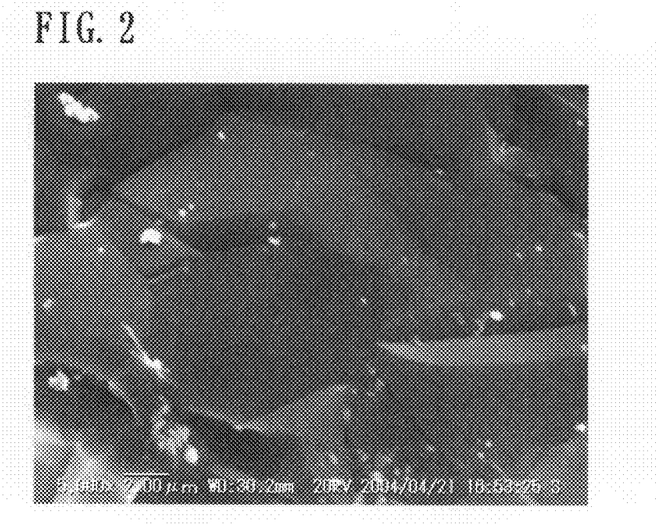
FIG. 2 is a micrograph showing the state of the surface of a thin film of a fragmented material 3, as viewed from the side opposite the thin film surface having thereon numerous continuous white small-width protrusions formed of titanium oxide on which forest microcolumns are exposed.

FIG. 1 is a micrograph of the multifunctional material obtained in Example 1. FIG. 1 shows the state where a layer 2 formed of white forest microcolumns of titanium oxide is exposed on a titanium sheet surface 1; and a fragmented material 3 remains on a portion of the layer 2, the fragmented material 3 including a thin film, numerous continuous white small-width protrusions provided thereon, and forest microcolumns formed on the protrusions, wherein the protrusions and microcolumns are formed of titanium oxide and exposed on the thin film. Such a titanium sheet surface is not generally exposed in the case where a multifunctional material is produced through the production methods described in Examples 1 to 4; i.e., the micrograph of FIG. 1 shows the state where a portion of the layer 2 formed of the forest microcolumns is removed from the titanium sheet surface 1. FIG. 2 is a micrograph showing the state of the surface of the thin film of the fragmented material 3, as viewed from the side opposite the thin film surface having thereon the numerous continuous white small-width protrusions formed of titanium oxide on which the microcolumns are exposed. FIG. 3 is a micrograph showing the state of the surface of the fragmented material 3, as viewed from the side where the thin film has thereon the numerous continuous white small-width protrusions formed of titanium oxide on which the microcolumns are exposed. FIG. 4 is a micrograph showing the state of the layer 2 formed of the white forest microcolumns of titanium oxide.

Example 5

A surface of a Ti-6Al-4V alloy sheet (thickness: 0.3 mm) was thermally treated with a combustion flame of acetylene at a surface layer temperature shown in Table 1 for a period of time shown in Table 1. Thereafter, when the surface subjected to the combustion flame was brought into contact with a flat surface of a stainless steel block (thickness: 30 mm) for cooling the sheet, the resultant product was separated into a material including the titanium alloy sheet, and a layer formed of forest microcolumns of a titanium alloy oxide, the layer exposed on the major portion of the titanium alloy sheet surface; and fragmented materials, each including a thin film, numerous continuous small-width protrusions provided thereon, and forest microcolumns formed on the protrusions, wherein the protrusions and microcolumns are formed of a titanium alloy oxide and exposed on the thin film.

Example 6

A titanium thin film (thickness: about 3 μm) was formed on a stainless steel sheet (SUS316) (thickness: 0.3 mm) through electron beam deposition. A surface of the thin film was thermally treated with a combustion flame of acetylene at a surface layer temperature shown in Table 1 for a period of time shown in Table 1. Thereafter, when the surface subjected to the combustion flame was brought into contact with a flat surface of a stainless steel block (thickness: 30 mm) for cooling the sheet, the resultant product was separated into a material including the stainless steel sheet, and a layer formed of white forest microcolumns of titanium oxide, the layer exposed on the major portion of the stainless steel sheet surface; and fragmented materials, each including a thin film, numerous continuous white small-width protrusions provided thereon, and forest microcolumns formed on the protrusions, wherein the protrusions and microcolumns are formed of titanium oxide and exposed on the thin film.

Comparative Example 1

A commercially available titanium oxide sol (STS-01, product of Ishihara Sangyo Kaisha, Ltd.) was applied onto a titanium sheet (thickness: 0.3 mm) through spin coating, followed by heating, to thereby form, on the titanium sheet, a titanium oxide coating exhibiting enhanced adhesion.

Test Example 1

Scratch Hardness Test: Pencil Method

Each of the materials obtained in Examples 1 to 6 (test pieces), in which a layer formed of forest microcolumns is exposed on the surface of a base sheet, was subjected to pencil scratch hardness test according to JIS K 5600-5-4 (1999) by use of pencils (Uni 1H to 9H, products of Mitsubishi Pencil Co., Ltd.). The test was performed on the surface of the material on the side of the microcolumns. The results are shown in Table 1. As shown in Table 1, even when a 9H pencil was employed, no damage was observed in all the test pieces.

Test Example 2

Chemical Resistance Test

Each of the materials obtained in Examples 1 to 6 (test pieces), in which a layer formed of forest microcolumns is exposed on the surface of a base sheet, was immersed in a 1M aqueous sulfuric acid solution or a 1M aqueous sodium hydroxide solution at room temperature for one week, followed by washing with water, and drying. Thereafter, the thus-treated material was subjected to pencil scratch hardness test in a manner similar to that described above. The results are shown in Table 1. As shown in Table 1, even when a 9H pencil was employed, no damage was observed in all the test pieces; i.e., the materials of Examples 1 to 6 exhibited high chemical resistance.

Test Example 3

Heat Resistance Test

Each of the materials obtained in Examples 1 to 6 (test pieces), in which a layer formed of forest microcolumns is exposed on the surface of a base sheet, was placed in a tubular furnace; the material was heated in an air atmosphere from room temperature to 500° C. over one hour; the material was maintained at 500° C. for two hours; and the material was left to cool to room temperature over one hour. Thereafter, the thus-treated material was subjected to pencil scratch hardness test in a manner similar to that described above. The results are shown in Table 1. As shown in Table 1, even when a 9H pencil was employed, no damage was observed in all the test pieces; i.e., the materials of Examples 1 to 6 exhibited high heat resistance.

[Table 1]

TABLE 1

|  | Fuel | Surface layer temperature | Heating time | Scratch hardness | Chemical resistance | Heat resistance |
| --- | --- | --- | --- | --- | --- | --- |
| Example 1 | Acetylene | 1100° C. | 10 minutes | Over 9H | Over 9H | Over 9H |
| Example 2 | Acetylene | 1200° C. | 7 minutes | Over 9H | Over 9H | Over 9H |
| Example 3 | Acetylene | 1220° C. | 8 minutes | Over 9H | Over 9H | Over 9H |
| Example 4 | Acetylene | 1250° C. | 10 minutes | Over 9H | Over 9H | Over 9H |
| Example 5 | Methane | 1100° C. | 10 minutes | Over 9H | Over 9H | Over 9H |
| Example 6 | Acetylene | 1100° C. | 8 minutes | Over 9H | Over 9H | Over 9H |

Test Example 4

Antifouling Test

There were employed, as samples, the material (surface area: 8 cm$^2$) obtained in Example 4, in which a layer formed of forest microcolumns is exposed on the surface of a base sheet, and the titanium-oxide-coated titanium sheet (surface area: 8 cm$^2$) obtained in Comparative Example 1. Each of the samples was subjected to deodorant test. Specifically, each of the samples was immersed in an aqueous methylene blue solution (80 mL, methylene blue concentration: about 10 μmol/L). After the effect of initial adsorption on a decrease in methylene blue concentration became negligible, the aqueous solution was irradiated with visible light by means of a fluorescent lamp with a UV cutoff filter (product of Matsushita Electric Industrial Co., Ltd.), and absorbance of the aqueous methylene blue solution at 660 nm was measured at a predetermined interval of irradiation time by means of a water quality inspection apparatus (DR/2400, product of HACH). The results are shown in FIG. 5.

Figure 5:
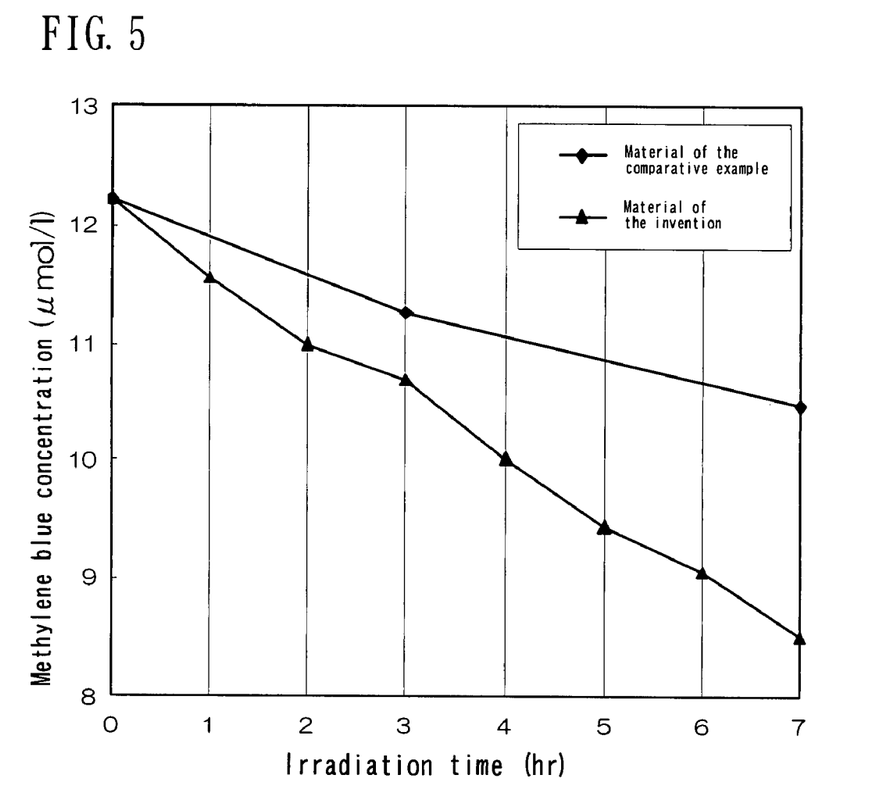
FIG. 5 is a graph showing the results obtained in Test Example 4 (antifouling test).

As is clear from FIG. 5, the material obtained in Example 4, in which a layer formed of forest microcolumns is exposed on the surface of a base sheet, degrades methylene blue at a higher rate, as compared with the case of the titanium-oxide-coated titanium sheet obtained in Comparative Example 1; i.e., the material of Example 4 exhibits high antifouling effect.

Test Example 5

Crystal Structure and Bond Characteristics

A sample collected from microcolumns of the material obtained in Example 3, in which a layer formed of forest microcolumns is exposed on the surface of a base sheet, was subjected to X-ray diffractometry (XRD), and as a result the sample was found to have a rutile crystal structure.

Figure 6:
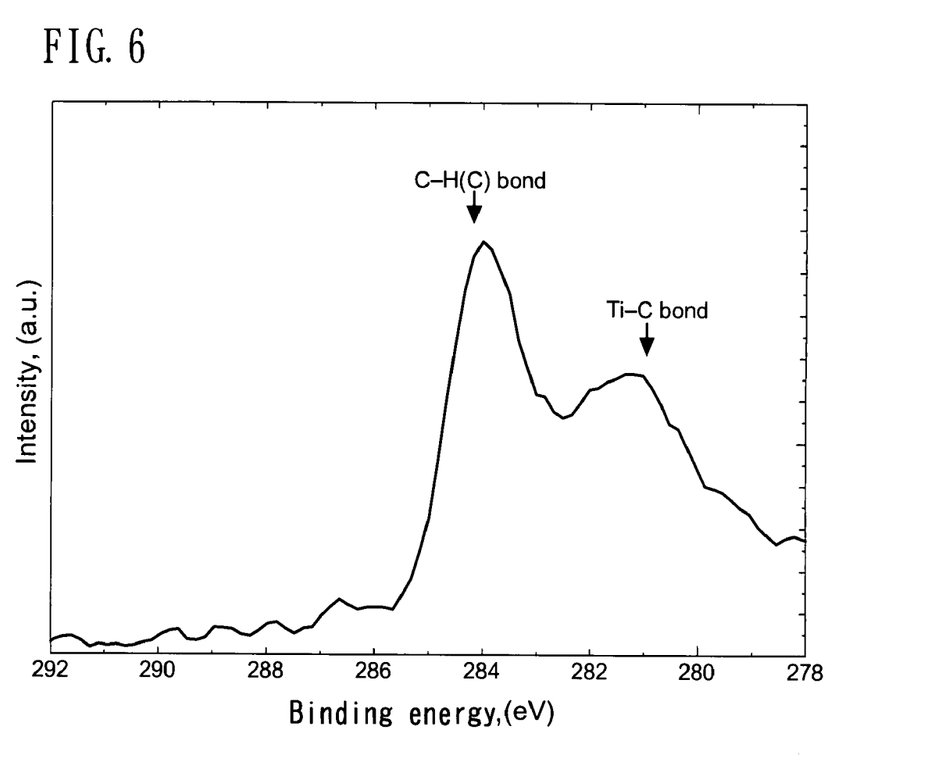
FIG. 6 is a graph showing the results obtained in Test Example 5 (crystal structure and bond characteristics).

Microcolumns of the material obtained in Example 3, in which a layer formed of forest microcolumns is exposed on the surface of a base sheet, were subjected to analysis by means of an X-ray photoelectron spectrometer (XPS) under the following conditions: acceleration voltage: 10 kV, target: Al, Ar ion sputtering: 2,700 seconds. When the sputtering rate is 0.64 Å/s, which corresponds to that of SiO$_2$ film, the depth is about 173 nm. The results of XPS analysis are shown in FIG. 6. The highest peak is observed at a binding energy of 284.6 eV. This peak is considered to correspond to a C—H(C) bond, which is generally observed through C1s analysis. The second highest peak is observed at a binding energy of 281.6 eV. The binding energy of a Ti—C bond is 281.6 eV, and thus the microcolumns of the material of Example 3 are considered to be doped with C in the form of Ti—C bond. XPS analysis was performed on 14 points at different height levels of the microcolumns, and as a result a peak similar to that described above was observed at 281.6 eV or thereabouts in an XPS spectrum corresponding to each of the points.

Example 7

Figure 7:
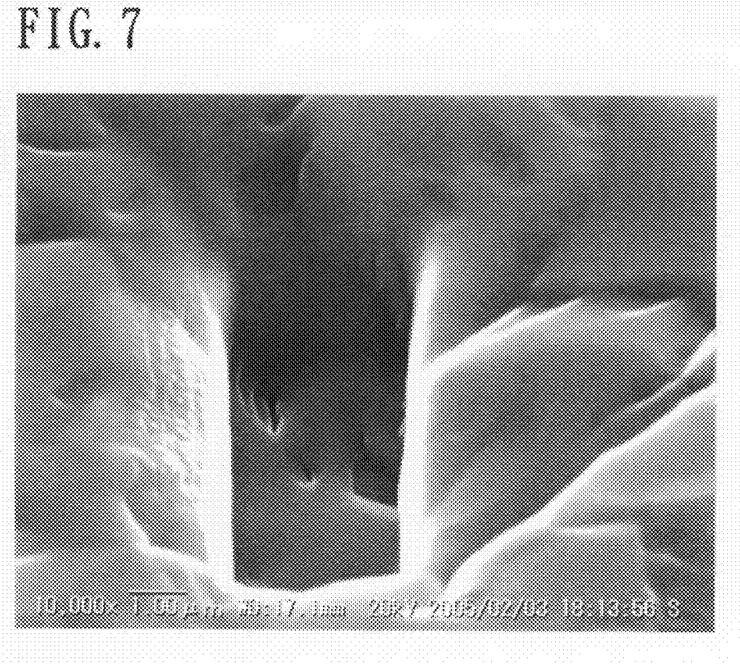
FIG. 7 is an SEM micrograph showing a test piece heated for 120 seconds in Example 7.
Figure 8:
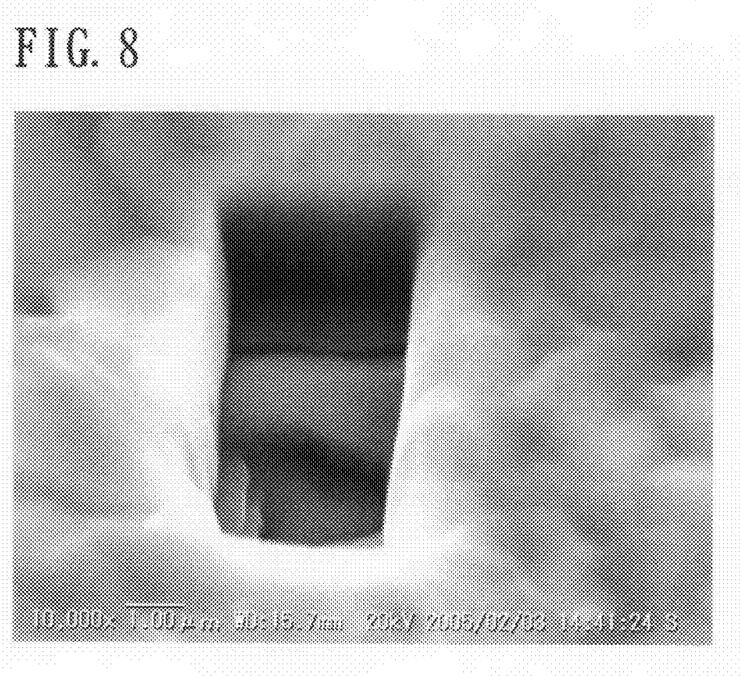
FIG. 8 is an SEM micrograph showing a test piece heated for 180 seconds in Example 7.
Figure 9:
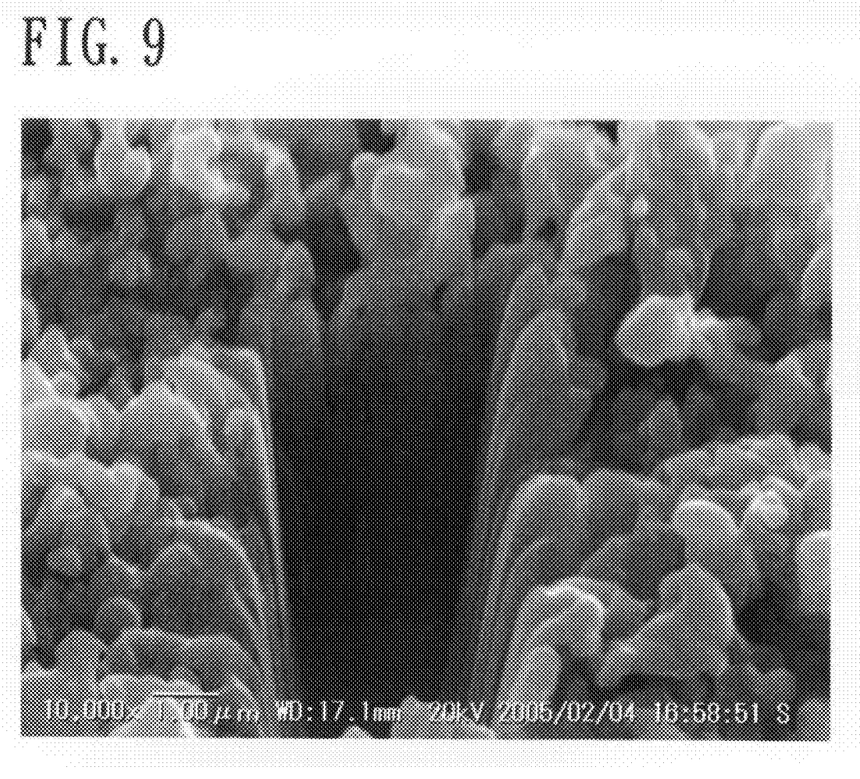
FIG. 9 is an SEM micrograph showing a test piece heated for 480 seconds in Example 7.

Titanium circular sheets, each having a diameter of 32 mm and a thickness of 0.3 mm, were employed as test pieces. The surfaces of the test pieces were heated by means of a combustion flame of acetylene so that the surface temperature was maintained at about 1,150° C. A first test piece was heated for 120 seconds, and then was left to cool. A second test piece was heated for 180 seconds, and then was left to cool. A third test piece was heated for 480 seconds, and immediately thereafter, the surface subjected to the combustion flame was brought into contact with a flat surface of a stainless steel block (thickness: 30 mm) for cooling the test piece. Through this cooling, a thin film is exfoliated from the surface of the titanium sheet, to thereby yield a material in which a layer formed of white forest microcolumns of titanium oxide is exposed on the titanium sheet surface. Holes, each having a size of 3 μm×12 μm and a depth of 10 μm, were provided in the surface of each of these three test pieces by means of an FIB-SEM apparatus (SMI8400SE, product of Seiko Instruments Inc.), and the side surfaces and bottom surface of each of the holes were observed by means of an SEM apparatus (VE7800, product of Keyence Corporation). FIG. 7 is an SEM micrograph showing the test piece heated for 120 seconds; FIG. 8 is an SEM micrograph showing the test piece heated for 180 seconds; and FIG. 9 is an SEM micrograph showing the test piece heated for 480 seconds. As shown in FIG. 8, in the test piece heated for 180 seconds, a microcolumnar structure begins to be formed at the lower portion of a coating. Therefore, conceivably, further continuous treatment with a flame extends microcolumns, to thereby form a microcolumnar structure as intended by the present invention.

The invention claimed is:

1. A multifunctional material characterized by having, on at least a portion of a surface of the material, a layer formed of forest microcolumns of titanium oxide or a titanium alloy oxide, the layer being exposed on the surface, wherein,
   each of the microcolumns is solid and has one of a prismatic form, a cylindrical form, a pyramidal form, a conical form, an inverted pyramidal form, an inverted conical form or a form of combination thereof, and
   the microcolumns are doped with carbon and are formed on the material.

2. A multifunctional material as described in claim 1, wherein carbon incorporated into the material through doping forms a T—C bond.

3. A multifunctional material as described in claim 2, which functions as a visible-light-responsive photocatalyst.

4. A multifunctional material as described in claim 2, wherein the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al.

5. A multifunctional material as described in claim 1, which functions as a visible-light-responsive photocatalyst.

6. A multifunctional material as described in claim 1, wherein the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al.

7. A multifunctional material, characterized by including a thin film of material, numerous continuous small-width protrusions formed on the film, and forest microcolumns formed on the protrusions,
   wherein the protrusions and microcolumns are formed of titanium oxide or a titanium alloy oxide, are doped with carbon, and are exposed on the thin film and each of the microcolumns is solid and has one of a prismatic form, a cylindrical form, a pyramidal form, a conical form, an inverted pyramidal form, an inverted conical form or a form of combination thereof.

8. A multifunctional material as described in claim 7, wherein carbon incorporated into the material through doping forms a T—C bond.

9. A multifunctional material as described in claim 8, which functions as a visible-light-responsive photocatalyst.

10. A multifunctional material as described in claim 8, wherein the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al.

11. A multifunctional material as described in claim 7, which functions as a visible-light-responsive photocatalyst.

12. A multifunctional material as described in claim 7, wherein the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al.

13. A multifunctional material, comprising:
a substrate with a surface layer of an unsaturated hydrocarbon thermally treated titanium oxide or titanium alloy oxide,
cuts through the surface layer defining protrusions; and
forest microcolumns exposed on the protrusions, wherein,
both the protrusions and the forest microcolumns are formed of the titanium oxide or the titanium alloy oxide,
the protrusions each have a height from 2 to 12 μm,
the height of the microcolumns is from 1 to 5 μm, and
the average diameter of the microcolumns is from 0.2 to 0.5 μm,
the protrusions and the forest microcolumns are carbon doped and comprise a Ti—C bond, and
the surface layer is a visible-light-responsive photocatalyst, and
each of the microcolumns is solid.

14. The multifunctional material of claim 13, wherein, each of the microcolumns has a pyramidal form.

15. The multifunctional material of claim 13, wherein, each of the microcolumns has a prismatic form.

16. The multifunctional material of claim 13 wherein, each of the microcolumns has a cylindrical form.

17. The multifunctional material of claim 13, wherein, the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al.

18. The multifunctional material of claim 13, wherein, the titanium alloy is Ti-6Al-4V, Ti-6Al-6V-2Sn, Ti-6Al-2Sn-4Zr-6Mo, Ti-10V-2Fe-3Al, Ti-7Al-4Mo, Ti-5Al-2.5Sn, Ti-6Al-5Zr-0.5Mo-0.2Si, Ti-5.5Al-3.5Sn-3Zr-0.3Mo-1Nb-0.3Si, Ti-8Al-1Mo-1V, Ti-6Al-2Sn-4Zr-2Mo, Ti-5Al-2Sn-2Zr-4Mo-4Cr, Ti-11.5Mo-6Zr-4.5Sn, Ti-15V-3Cr-3Al-3Sn, Ti-15Mo-5Zr-3Al, Ti-15Mo-5Zr, or Ti-13V-11Cr-3Al, and each of the microcolumns is solid and has one of a prismatic form, a cylindrical form, a pyramidal form, a conical form, an inverted pyramidal form, an inverted conical form or a form of combination thereof.

* * * * *